United States Patent
Xia et al.

(10) Patent No.: US 11,456,599 B2
(45) Date of Patent: Sep. 27, 2022

(54) THREE-PHASE POWER SUPPLY SYSTEM AND POWER SUPPLY METHOD

(71) Applicant: Delta Electronics (Shanghai) Co., Ltd., Shanghai (CN)

(72) Inventors: Tao Xia, Shanghai (CN); Hong Liu, Shanghai (CN); Cheng Lu, Shanghai (CN); Sheng-Hua Li, Shanghai (CN)

(73) Assignee: DELTA ELECTRONICS (SHANGHAI) CO., LTD., Shanghai (CN)

( * ) Notice: Subject to any disclaimer, the term of this patent is extended or adjusted under 35 U.S.C. 154(b) by 0 days.

(21) Appl. No.: 17/334,830

(22) Filed: May 31, 2021

(65) Prior Publication Data

US 2021/0391724 A1 Dec. 16, 2021

(30) Foreign Application Priority Data

Jun. 10, 2020 (CN) .......................... 202010524883.1

(51) Int. Cl.
*H02J 3/26* (2006.01)
*H02J 3/18* (2006.01)
(Continued)

(52) U.S. Cl.
CPC ........ *H02J 3/26* (2013.01); *H02J 3/18* (2013.01); *H02J 3/38* (2013.01);
(Continued)

(58) Field of Classification Search
CPC .... H02M 1/4208; H02M 5/225; H02M 1/325; H02M 1/0016; H02M 7/2173;
(Continued)

(56) References Cited

U.S. PATENT DOCUMENTS

2007/0179720 A1    8/2007  Becker et al.
2009/0154203 A1*   6/2009  Kravitz ................... H02M 1/12
                                                         363/45
(Continued)

FOREIGN PATENT DOCUMENTS

CN    201556947 U    8/2010
CN    102804580 A    11/2012

OTHER PUBLICATIONS

Hossein Dehghani Tafti et al., "Flexible Control of Photovoltaic Grid-Connected Cascaded H-Bridge Converters During Unbalanced Voltage Sags", IEEE Transactions on Industrial Electronics, IEEE Service Center, Piscataway, NJ, USA, vol. 65, No. 8, Aug. 1, 2018.

*Primary Examiner* — Jared Fureman
*Assistant Examiner* — Esayas G Yeshaw
(74) *Attorney, Agent, or Firm* — CKC & Partners Co., LLC

(57) ABSTRACT

A three-phase power supply system includes three phase branches forming a delta connection. Each of the phase branches includes at least one power conversion cell of at least two stages. The at least one power conversion cell of each of the phase branches is connected in parallel to the at least one power conversion cell of the respective other two phase branches. When one of the phase branches stops operating, the other two phase branches keep operating, and three phase current of the three-phase power supply system can be balanced by regulating active powers and reactive powers of the other two phase branches. Through the invention, when one of the phase branches stops operating, the other two phase branches may keep operating, and three phase current of the three-phase power supply system are balanced.

20 Claims, 6 Drawing Sheets

(51) Int. Cl.
  *H02J 3/38*  (2006.01)
  *H02J 13/00*  (2006.01)
  *H02M 1/42*  (2007.01)
  *H02M 5/42*  (2006.01)

(52) U.S. Cl.
  CPC ..... *H02J 13/00006* (2020.01); *H02M 1/4208* (2013.01); *H02M 5/42* (2013.01)

(58) Field of Classification Search
  CPC .... H02M 1/0025; H02M 5/42; H02M 1/4216; H02M 1/0074; H02J 13/00006; H02J 3/26; H02J 3/38; H02J 3/00; H02J 3/18
  See application file for complete search history.

(56) References Cited

U.S. PATENT DOCUMENTS

| | | | | |
|---|---|---|---|---|
| 2009/0267572 | A1* | 10/2009 | Engelhardt | H02P 23/26 322/61 |
| 2013/0051105 | A1* | 2/2013 | Wang | H02M 1/42 363/132 |
| 2016/0349818 | A1 | 12/2016 | Sonnaillon | |
| 2017/0133949 | A1* | 5/2017 | Pieschel | H02M 1/32 |
| 2018/0212430 | A1* | 7/2018 | Chung | H02J 3/1807 |
| 2019/0190276 | A1* | 6/2019 | Liu | H02J 3/01 |
| 2019/0257211 | A1* | 8/2019 | Huang | H02M 7/06 |
| 2019/0305688 | A1* | 10/2019 | Seymour | H02M 7/219 |
| 2021/0288591 | A1* | 9/2021 | Kuhn | H02J 3/1857 |

* cited by examiner

THREE-PHASE POWER SUPPLY SYSTEM AND POWER SUPPLY METHOD

CROSS-REFERENCE TO RELATED APPLICATIONS

This non-provisional application claims priority under 35 U.S.C. § 119(a) on Patent Application No. 202010524883.1 filed in P.R. China on Jun. 10, 2020, the entire contents of which are hereby incorporated by reference.

Some references, if any, which may include patents, patent applications, and various publications, may be cited and discussed in the description of this invention. The citation and/or discussion of such references, if any, is provided merely to clarify the description of the present invention and is not an admission that any such reference is "prior art" to the invention described herein. All references listed, cited, and/or discussed in this specification are incorporated herein by reference in their entireties and to the same extent as if each reference was individually incorporated by reference.

BACKGROUND OF THE INVENTION

1. Field of the Invention

The invention relates to the technical field of power electronics, and particularly to a three-phase power supply system and a power supply method therefor.

2. Related Art

Solid State Transformers (SSTs) act as "energy routers" converting active/reactive powers with a medium voltage AC grid, and reliability is a key performance index for them. Currently, to improve reliability, the number of cascaded modules is increased to realize N–1 or N–M redundancy, or systems are connected in parallel to realize system-level redundancy.

One type of SST architecture, for example, is formed by connecting isolation modules in series and in parallel in two-stage. Medium voltage AC sides are connected in series through a Cascaded H-Bridge (CHB), and connected to a three-phase AC medium voltage grid through a delta connection; while low voltage DC sides of all modules of three phases are connected in parallel to form a low voltage DC bus, to connect a load or a power source such as an inverter, or a charging pile of vehicles. Requirements of control method of the SST comprises (1) three-phase current control, such as three-phase current balance, at the medium voltage AC sides; (2) equalization among average bus voltages of the respective modules; (3) voltage, current, or power control at the low voltage DC sides as needed; (4) voltage/current balance control among the modules.

To further improve the reliability of the SST, an "open delta" operation mode can be utilized, wherein when a bridge arm of the SST has a failure, the failed phase bridge arm is cut off, and the remaining two phases keep the three-phase current balance at the medium voltage AC sides while supplying powers. As for scenarios such as connected to new energy, a power factor (PF) shall be remained during "open delta" operation, to meet relevant standards of GBT29321-2012 and GBT19963-2011.

There are reference documents discussing how to realize "open delta" operation in Static Var Generator (SVG) and solar photovoltaic (PV) based on a CHB architecture. However, due to limitation of the CHB architecture, when SVG is in the "open delta" operation mode, to keep the balance of bus voltages, a negative-sequence current has to be additionally injected to a medium voltage AC grid side, resulting in an imbalance of grid-side currents; when solar photovoltaic is in the "open delta" operation mode, to keep the balance of bus voltages, a reactive current has to be additionally injected to the medium voltage AC grid side, resulting in that the system cannot meet the requirement of the power factor.

Besides, buses in the CHB architecture are in a float state, so an "open delta" operation scheme based on the CHB architecture does not support operation with an arbitrary power factor, i.e., a four-quadrant operation.

However, the difference between the SST architecture and the CHB architecture is that the SST architecture provides a common DC bus at the low voltage DC side, so it is possible to regulate active and reactive powers on the bridge arms without failure during "open delta" operation, such that a four-quadrant operation may be supported while keeping three-phase current balance on the grid-side.

In other words, when SST architecture operates in "open delta", it is unnecessary to additionally inject negative-sequence or reactive current to the medium voltage AC grid side.

SUMMARY OF THE INVENTION

An object of the invention is to provide a three-phase power supply system and a power supply method therefor, such that when one of the phase branches stops operating, the other two phase branches may keep operating, and three-phase currents of the three-phase power supply system may be symmetrical.

To realize the above object, the invention provides a three-phase power supply system comprising three phase branches forming a delta connection. Each of the phase branches comprises at least one power conversion cell, the power conversion cell being of at least two stages. The at least one power conversion cell of each of the phase branches is connected in parallel to the at least one power conversion cell of each of the other two phase branches. When one of the phase branches stops operating, the other two phase branches keep operating, and three phase current of the three-phase power supply system can be balanced by regulating the active powers and reactive powers of the other two phase branches.

To realize the above object, the invention further provides a power supply method for a three-phase power supply system, wherein the three-phase power supply system comprises three phase branches forming a delta connection; each of the phase branches comprising at least one power conversion cell, the power conversion cell being of at least two stages; the at least one power conversion cell of each of the phase branches being connected in parallel to the at least one power conversion cell of each of the other two phase branches; the power supply method comprises:

when one of the phase branches stops operating, keeping the operation of the other two phase branches, and regulating active powers and reactive powers of the other two phase branches to balance three phase current of the three-phase power supply system.

BRIEF DESCRIPTION OF THE DRAWINGS

The exemplary embodiments will be described in detail with reference to the accompanying drawings, through which the above and other features and advantages of the disclosure will become more apparent.

DETAILED EMBODIMENTS OF THE INVENTION

Figure 1:
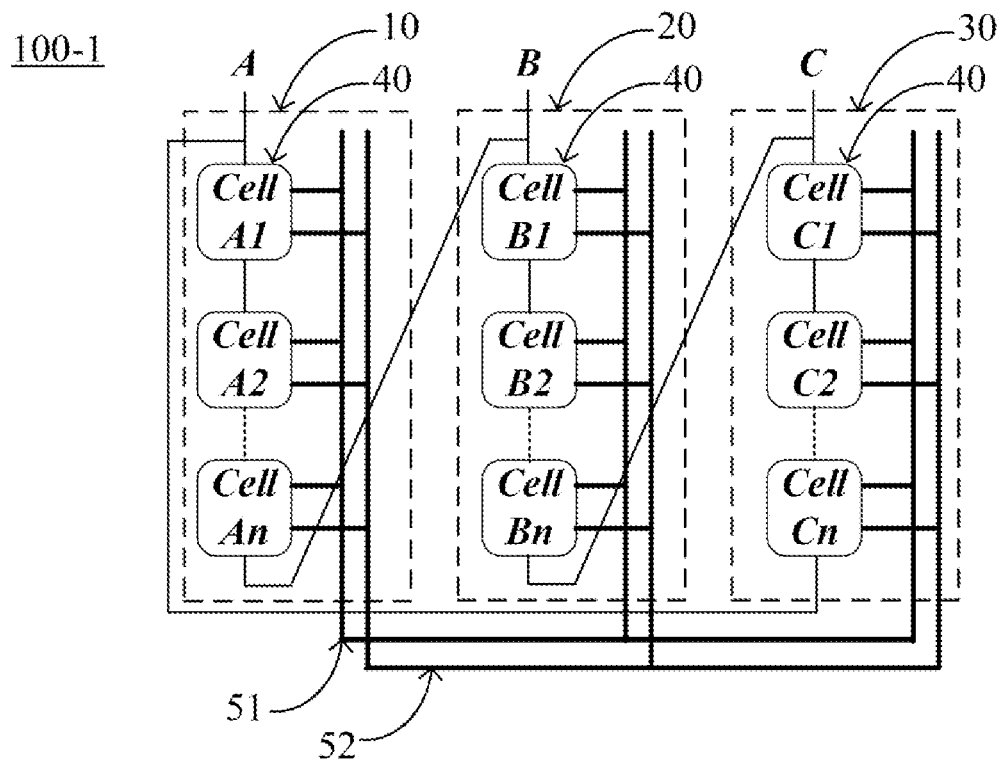
FIG. 1 is a schematic diagram illustrating the circuit architecture of a three-phase power supply system according to a first preferred embodiment of the invention.

The exemplary embodiments will now be described more fully with reference to the accompanying drawings. However, the exemplary embodiments can be implemented in various forms and shall not be understood as being limited to the embodiments set forth herein; on the contrary, these embodiments are provided so that this invention will be thorough and complete, and the conception of exemplary embodiments will be fully conveyed to those skilled in the art. In the drawings, the same reference sign denotes the same or similar structure, so their detailed description will be omitted.

When factors/components/the like described and/or illustrated here are introduced, the phrases "one", "a(an)", "the", "said" and "at least one" refer to one or more factors/components/the like. The terms "include", "comprise" and "have" refer to an open and included meaning, and refer to additional factors/components/the like, in addition to the listed factors/components/the like. Besides, the terms "first", "second" and the like in the claims are only used as signs, instead of numeral limitations to objects.

As shown in FIG. 1, a three-phase power supply system 100-1 according to a first preferred embodiment of the invention is a delta-connection SST architecture with outputs sharing a bus. The three-phase power supply system 100-1 comprises three phase branches, for example, an A-phase branch 10, a B-phase branch 20, and a C-phase branch 30, forming a delta connection. Moreover, each of the phase branches comprises a plurality of power conversion cells 40. For example, the A-phase branch 10 comprises n power conversion cells Cell A1, Cell A2, . . . , and Cell An, the B-phase branch 20 comprises n power conversion cells Cell B1, Cell B2, . . . , and Cell Bn, and the C-phase branch 30 comprises n power conversion cells Cell C1, Cell C2, . . . , and Cell Cn. These power conversion cells 40, for example, may be in at least two stages structure. The power conversion cells of each phase branches are connected in parallel to the power conversion cells of the other two phase branches. Furthermore, when one of the phase branches stops operating, the other two phase branches keep operating, and three phase current of the three-phase power supply system can be balanced by regulating the active powers and reactive powers of the other two phase branches.

Figure 2:
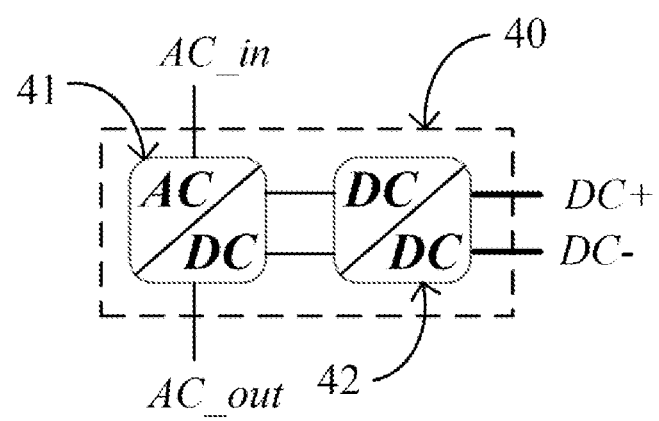
FIG. 2 is a structural diagram illustrating a power conversion cell in FIG. 1.

In the embodiment of FIG. 1, as shown in FIG. 2, each power conversion cell 40, for example, may be in a two-stage isolation structure, and may comprise, for example, a first stage converter 41 and a second stage converter 42 in cascaded connection. The first stage converter 41, for example, may be an AC/DC converter having an AC input terminal AC_in and an DC output terminal AC_out, and the second stage converter 42, for example, may be a DC/DC converter having a first terminal (such as a DC+ terminal) and a second terminal (such as a DC− terminal) at a DC side. Of course, it shall be understood that in other embodiments, the power conversion cells 40 can also be in a multi-stage isolation structure, but the invention is not limited thereto.

In the embodiment of FIG. 1, AC sides of the power conversion cells of the respective phase branches of the three-phase power supply system 100-1 with the SST architecture are connected in series and form a delta connection connected to an AC grid, such as a medium voltage AC grid. Low voltage DC sides of all power conversion cells of the three phase branches are connected in parallel to a common bus. For example, AC sides of the plurality of power conversion cells 40 of the respective phase branches of the A-phase branch 10, the B-phase branch 20, and the C-phase branch 30 are connected in series and form a delta connection connected to an AC grid. The first terminals (such as the DC+ terminals) at the DC sides of all power conversion cells 40 of the A-phase branch 10, the B-phase branch 20, and the C-phase branch 30 are connected in parallel to a first bus 51, and the second terminals (such as the DC− terminals) at the DC sides of all power conversion cells 40 of the A-phase branch 10, the B-phase branch 20 and the C-phase branch 30 are connected in parallel to a second bus 52.

Generally, for the three-phase power supply system 100-1 of the delta-connection SST architecture with outputs sharing a bus as illustrated in FIG. 1, assuming that a CA-phase bridge arm (such as the C-phase branch 30) has a failure, the system enters into an "open delta" operation mode. According to demand for reactive powers of the system, active powers of an AB-phase bridge arm (such as the A-phase branch 10) and a BC-phase bridge arm (such as the B-phase branch 20) without failure are regulated, and reactive powers are regulated correspondingly, such that three-phase current balance of grid is maintained while satisfying the demand for powers.

When the system enters into the "open delta" operation mode, assuming that a reactive power command of the system is $q_r$, and a low voltage DC power is $p_r$, active powers of the remaining AB phase and BC phase shall be regulated to $$p_{AB} = \frac{p_r}{2} + \frac{q_r}{2\sqrt{3}},$$

$$p_{BC} = \frac{p_r}{2} - \frac{q_r}{2\sqrt{3}}.$$

Meanwhile, reactive powers of the AB phase and BC phase shall be regulated to $$q_{AB} = -\frac{p_r}{2\sqrt{3}} + \frac{q_r}{2},$$

$$q_{BC} = \frac{p_r}{2\sqrt{3}} + \frac{q_r}{2}.$$

It shall be noted that after regulation, the total active power of the system is still $p_r$, and total reactive power is $q_r$, as long as there is no overcurrent in respective bridge arms (phase branches). In one embodiment, the reactive power $q_r$ is a reactive power command given by the system.

In particular, when the reactive power command $q_r$ of the system is 0, i.e., a power factor PF is 1, the active powers of the remaining AB phase and BC phase shall be the same, i.e., $$p_{AB} = p_{BC} = \frac{p_r}{2},$$

while the reactive powers shall be $$q_{AB} = \frac{-p_r}{2\sqrt{3}},$$
$$q_{BC} = \frac{p_r}{2\sqrt{3}}.$$

Figure 3:
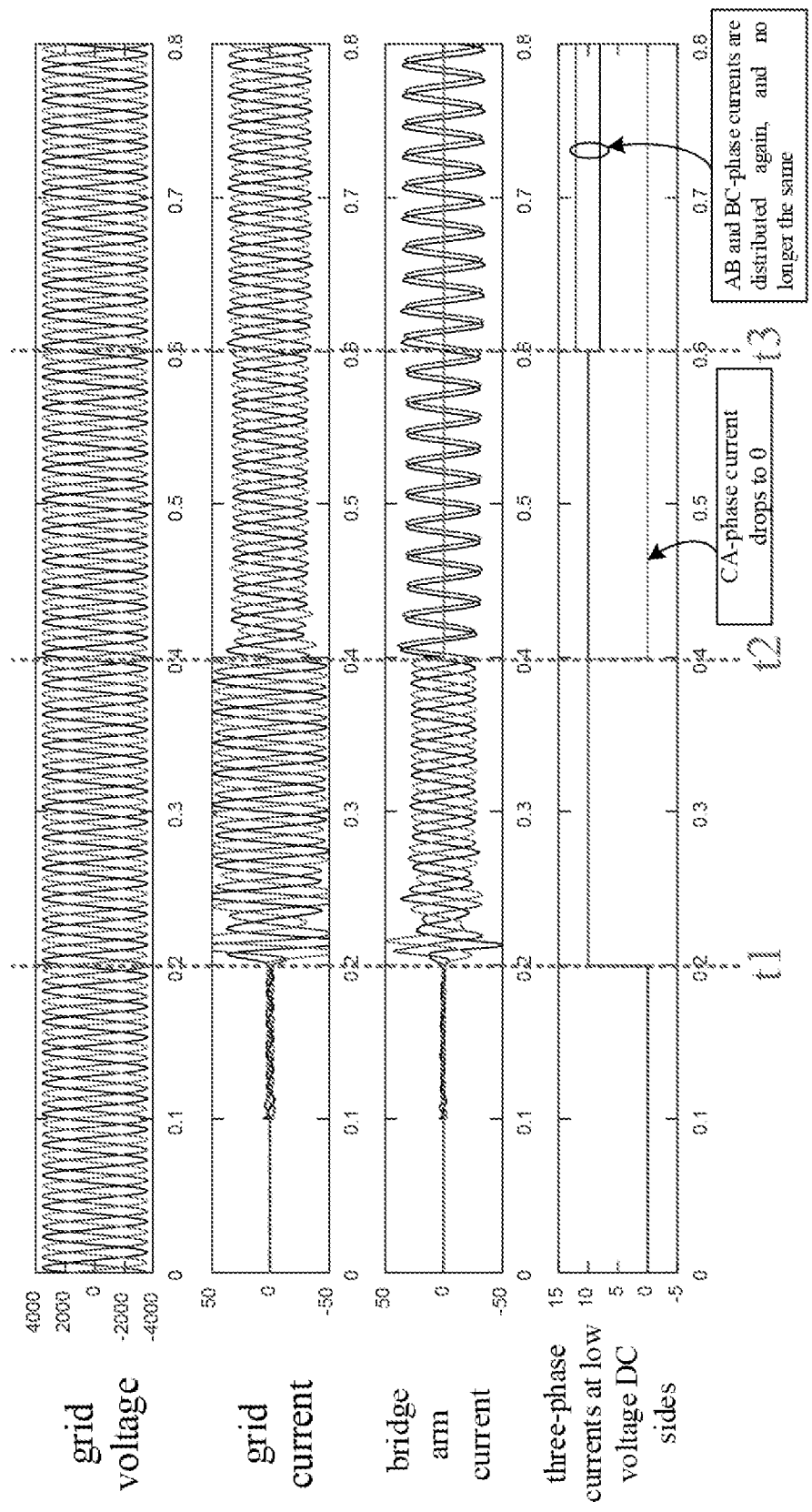
FIG. 3 is a schematic diagram illustrating the simulation waveforms of the three-phase power supply system shown in FIG. 1.

FIG. 3 illustrates simulation waveforms of the three-phase power supply system according to the invention, wherein,
(1) at t1, the system begins to operate normally;
(2) at t2, the CA-phase bridge arm has a failure, and a current of the CA-phase bridge arm drops to zero. The reactive power command $q_r$ of the system is 0, and the grid-side three-phase current balance is maintained by regulating active powers and reactive powers of the AB-phase bridge arm and the BC-phase bridge arm, while a grid voltage is in phase with a grid current, i.e., PF=1;
(3) at t3, the reactive power command $q_r$ of the system is not 0. Accordingly, the active powers and the reactive powers of the AB-phase bridge arm and the BC-phase bridge arm are regulated to maintain grid-side three-phase current balance, while the grid voltage is no longer in phase with the grid current, and the reactive power is a command value.

Figure 4:
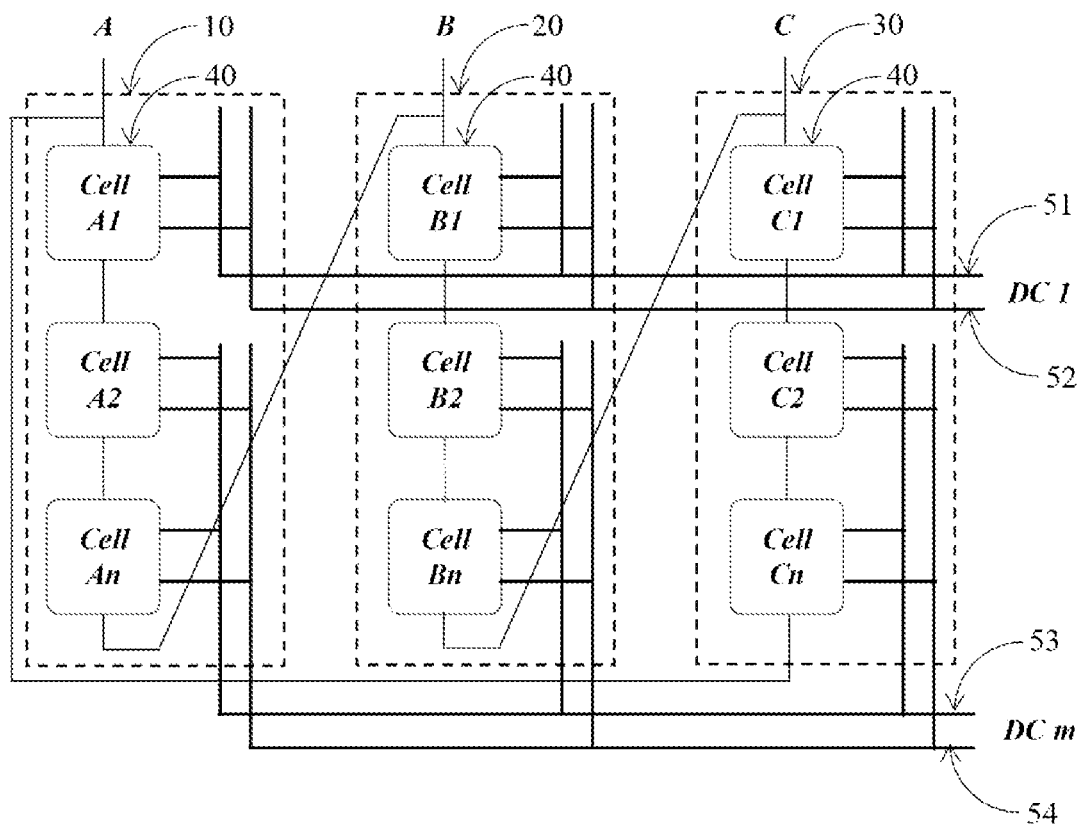
FIG. 4 is a structural diagram illustrating a circuit of a three-phase power supply system according to a second preferred embodiment of the invention.

FIG. 4 illustrates a circuit architecture of a three-phase power supply system 100-2 according to a second preferred embodiment of the invention, which is a multi-port delta-connection SST architecture. N power conversion cells 40 of the respective phase branches of the A-phase branch 10, the B-phase branch 20, and the C-phase branch 30 are connected in series at AC sides and form a delta connection connected to an AC grid, while the respective phase branches of the A-phase branch 10, the B-phase branch 20 and the C-phase branch 30 have m DC ports, i.e., DC1, . . . , and DCm at DC sides, where m is greater than or equal to 2, and the at least one DC port is connected to the A-phase branch 10, the B-phase branch 20 and the C-phase branch 30 simultaneously. For example, in FIG. 4, the first terminals and the second terminals at the DC sides of the power conversion cell Cell A1 in the A-phase branch 10, the power conversion cell Cell B1 in the B-phase branch 20, and the power conversion cell Cell C1 in the C-phase branch 30 are connected in parallel to the first bus 51 and the second bus 52 respectively to form a DC port DC1, and the first terminals and the second terminals at the DC sides of the power conversion cells Cell A2 to Cell An in the A-phase branch 10, the power conversion cells Cell B2 to Cell Bn in the B-phase branch 20 and the power conversion cells Cell C1 to Cell Cn in the C-phase branch 30 are connected in parallel to a third bus 53 and a fourth bus 54 respectively to form a DC port DCm.

Figure 5:
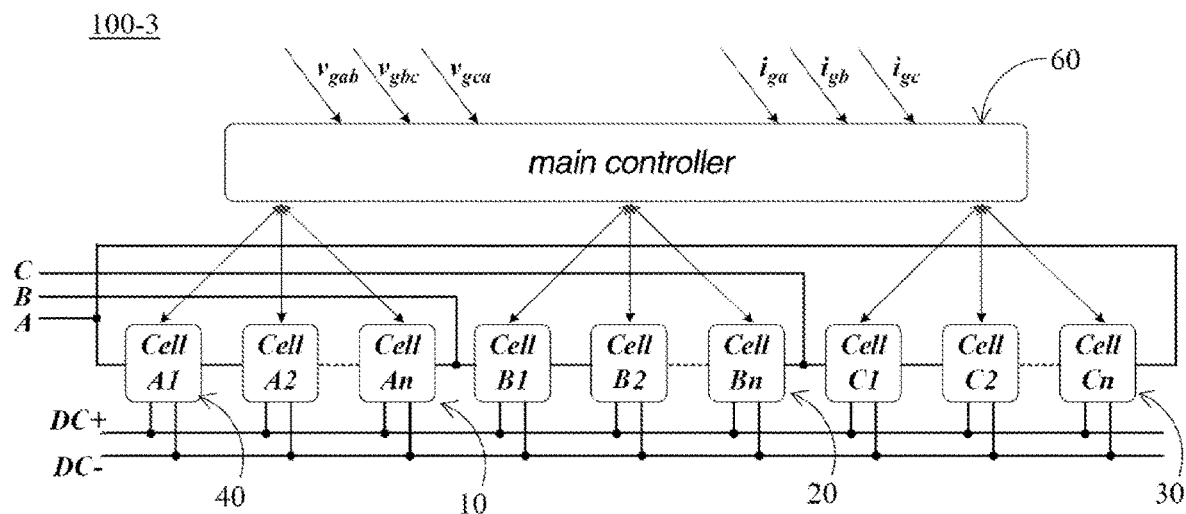
FIG. 5 is a structural diagram illustrating a circuit of a three-phase power supply system according to a third preferred embodiment of the invention.

There are several different embodiments of a three-phase power supply system in combination with controller architecture. FIG. 5 illustrates the circuit architecture of a three-phase power supply system 100-3 according to a third preferred embodiment of the invention. The three-phase power supply system 100-3 is an implementation adopting a centralized controller, and further comprises a main controller 60 based on the circuit architecture shown in FIG. 1. The main controller 60 is in communication connection with the at least one power conversion cell 40 of the three phase branches 10, 20, and 30, receives signals from the three phase branches 10, 20, and 30 and regulates the three phase branches 10, 20 and 30 according to the signals. For example, the main controller 60 can receive signals of three-phase grid voltages $v_{gab}$, $v_{gbc}$, $v_{gca}$, and three-phase grid currents $i_{ga}$, $i_{gb}$, $i_{gc}$, and regulate correspondingly. Through the three-phase power supply system 100-3 shown in FIG. 5 in combination with the foregoing scheme, when one phase branch has a failure, only that phase stops powering, and the system still maintains partial power supply capacity.

Figure 6:
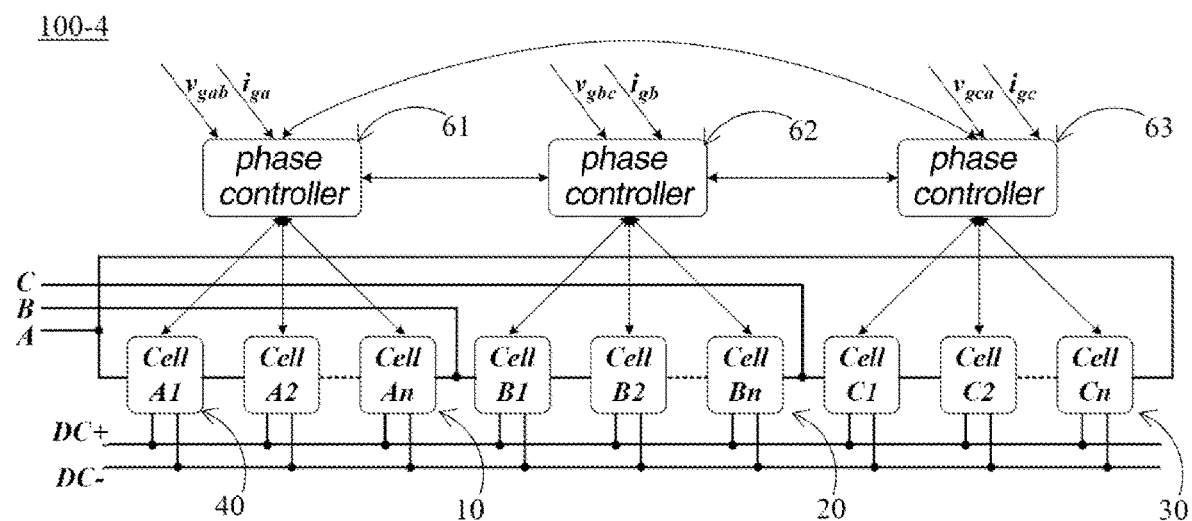
FIG. 6 is a structural diagram illustrating a circuit of a three-phase power supply system according to a fourth preferred embodiment of the invention.

FIG. 6 illustrates the circuit architecture of a three-phase power supply system 100-4 according to a fourth preferred embodiment of the invention. The three-phase power supply system 100-4 is an implementation adopting distributed phase controllers, and further comprises at least three phase controllers 61, 62, 63 based on the circuit architecture shown in FIG. 1. The phase controllers 61, 62, 63 are correspondingly in communication connection with the at least one power conversion cell 40 of each of the three phase branches 10, 20, 30, respectively, and each of the phase controllers 61, 62, 63 may further include a communication interface through which the at least three phase controllers 61, 62, 63 are in communication connection with each other. The corresponding phase controller of each of the phase branches receives signals sent from the corresponding phase controllers of the other two phase branches and signals of the phase through the communication interface to regulate the phase branch. For example, the phase controller 61 may receive signals such as a grid voltage $v_{gab}$, a grid current $i_{ga}$, and active power signals of the other two phases, and regulate the phase branch 10 correspondingly. The phase controller 62 may receive signals such as a grid voltage $v_{gbc}$, a grid current $i_{gb}$, and active power signals of the other two phases, and regulate the phase branch 20 correspondingly. The phase controller 63 may receive signals such as a grid voltage $v_{gca}$, a grid current $i_{gc}$, and active power signals of the other two phases, and regulate the phase branch 30 correspondingly. Using the three-phase power supply system 100-4 shown in FIG. 6, no matter which phase branch has failure or the corresponding phase controller has a failure, only that phase stops powering, such that single point failure risks brought by the failure of the centralized controller can be eliminated.

Figure 7:
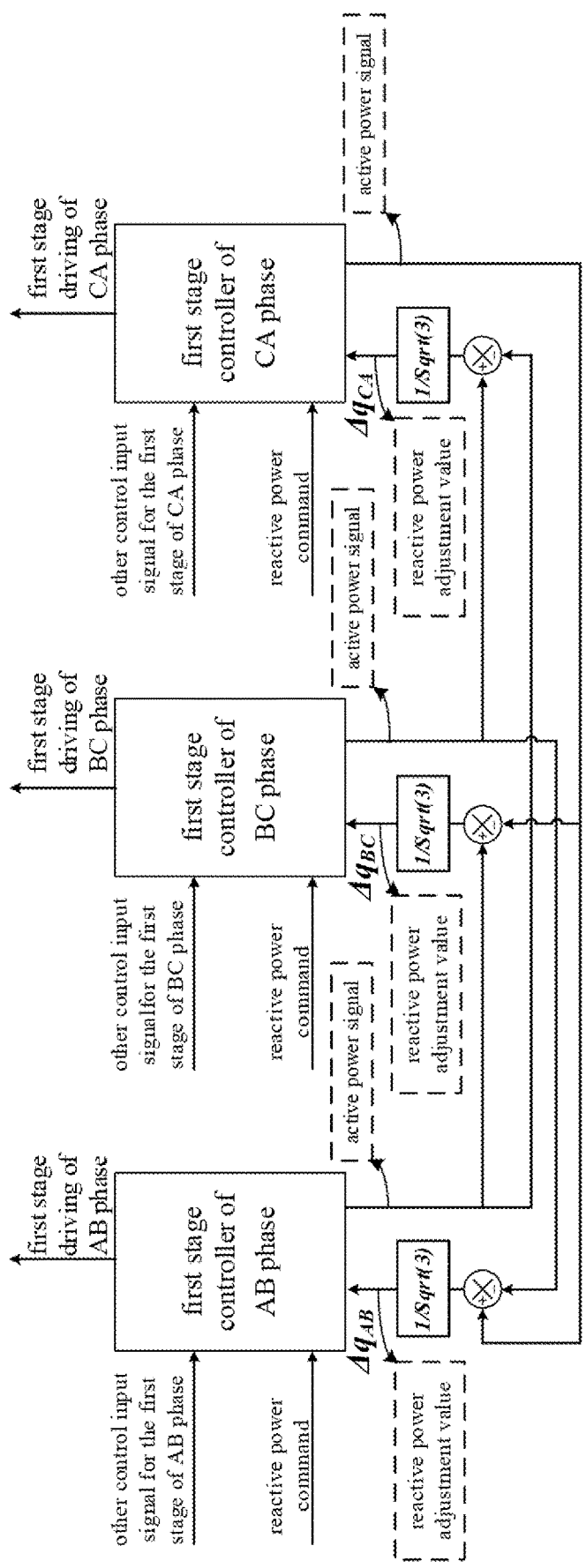
FIG. 7 illustrates a schematic diagram of a first stage control algorithm of the two-stage power conversion cell shown in FIG. 2.
Figure 8:
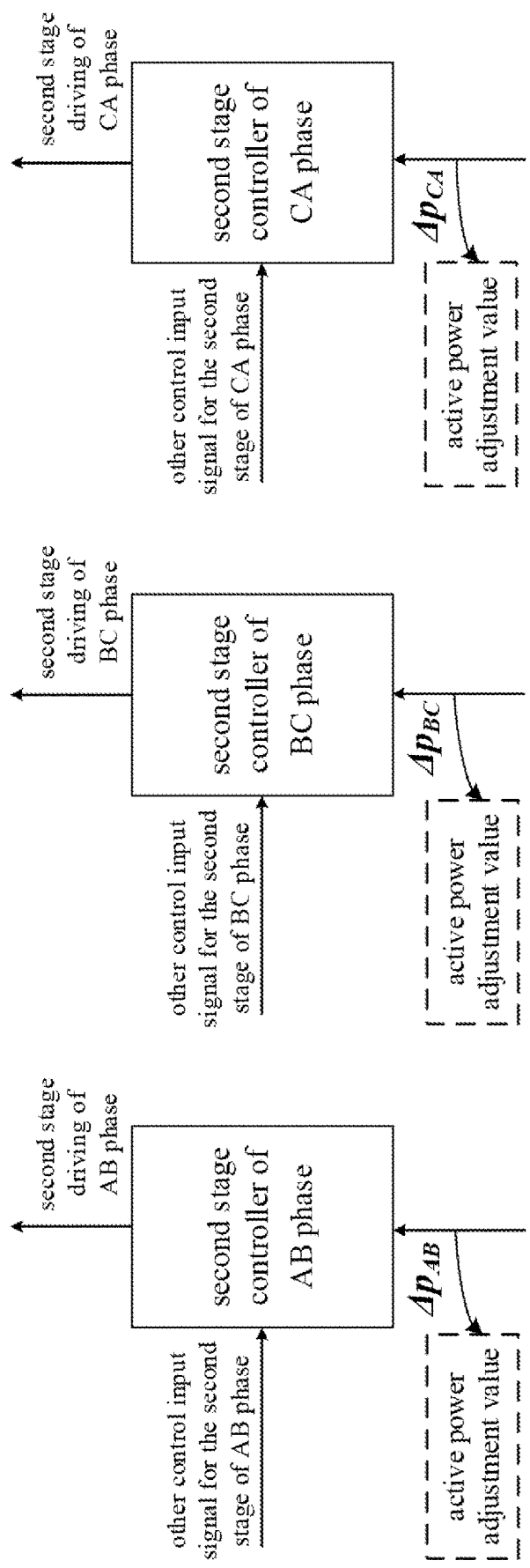
FIG. 8 illustrates a schematic diagram of a second stage control algorithm of the two-stage power conversion cell shown in FIG. 2.

FIGS. 7 and 8 illustrate block diagrams of first stage control and second stage control of the two-stage power conversion cell shown in FIG. 2, respectively, which control the first stage converter and the second stage converter of the power conversion cell shown in FIG. 2, respectively. As shown in FIG. 7, in the block diagram of first stage control, an average bus voltage output from the first stage converters of the respective power conversion cells in the corresponding phase branch may be controlled, and each of the phase branches controls reactive powers of the corresponding phase branch by receiving active power signals of the other two phase branches, receiving a reactive power command of the system, and generating reactive power adjustment values of the respective phase branches. As shown in FIG. 8, in the block diagram of second stage control, each of the phase branches may control active powers at DC sides of the second stage converters of the respective power conversion cells in the corresponding phase branch by receiving active power adjustment values of the other two phase branches. In one embodiment, voltages, currents, and powers at the DC sides are controlled further.

As shown in FIG. 7, as for the first stage controller, the first stage controllers of the respective phases connected in parallel to the same port control an average bus voltage of the respective power conversion cells, while receiving active power signals of the other two phases, and generating reactive power adjustment values $\Delta q_{AB}$, $\Delta q_{BC}$ and $\Delta q_{CA}$ of the respective phases, and $$\Delta q_{AB} = \frac{1}{\sqrt{3}}(p_{CA} - p_{BC}),$$

$$\Delta q_{BC} = \frac{1}{\sqrt{3}}(p_{AB} - p_{CA}),$$

$$\Delta q_{CA} = \frac{1}{\sqrt{3}}(p_{BC} - p_{AB}),$$

where $p_{AB}$, $p_{BC}$, $p_{CA}$ are active power signals of the three phases.

Meanwhile, the first stage controllers of the respective phases further receive a reactive power command of the system, and the reactive power command of each phase is $$\frac{q_r}{3}.$$

The active powers of each phase are regulated according to the reactive power adjustment values and the reactive power command of each phase.

As shown in FIG. 8, in addition to controlling voltages/currents or powers at low voltage DC sides on demand, the second stage controllers of the respective phases further need to introduce active power adjustment values $\Delta p_{AB}$, $\Delta p_{BC}$ and $\Delta p_{CA}$ to distribute active powers at the low voltage DC sides on three-phase bridge arms. During normal operation, there is $\Delta p_{AB} = \Delta p_{BC} = \Delta p_{CA} = 0$, so active powers at the DC sides are distributed to the three-phase bridge arms evenly. During the "open delta" operation, the requirement for four-quadrant operation is satisfied according to values in the foregoing schemes. For example, when the CA phase has a failure, $\Delta p_{AB} = q_r/(2\sqrt{3})$ and $\Delta p_{BC} = -q_r/(2\sqrt{3})$. In particular, when the reactive power command $q_r$ of the system is 0, the active powers at the DC sides are distributed evenly to the remaining two phase bridge arms without failure.

The foregoing schemes concern circumstances in which overcurrent is not caused on the bridge arms after regulation of the active/reactive powers of the phase bridge arms without failure. Actually, when loads of the system are heavy, the foregoing schemes may cause one phase or two phases without failure triggering overcurrent protection, so the current limiting operation may be introduced in such circumstances.

Before the current limiting operation is triggered, the system can still realize the four-quadrant operation.

After the current limiting operation is triggered, the system gives priority to demand for active powers, or gives priority to demand for reactive powers, or gives priority to demand for fixed power factors, according to a preset priority. This embodiment takes giving priority to the demand for active powers as an example.

Assuming that the maximum apparent power of the system is $S_{MAX}$, and the active power of the system is $$p_{r\_pre} = \beta \frac{2}{3} S_{MAX}$$

before failure, a value range of the active power $p_{r\_post}$ and the reactive power command $q_{r\_post}$ of the system after failure is:

$$\left| \begin{array}{l} p_{r\_post} = \frac{S_{MAX}}{\sqrt{3}} \\ q_{r\_post} = 0 \end{array} \right. \text{ when } \beta \geq \frac{\sqrt{3}}{2}.$$

The formula shows that when the active power of the system is $$p_r \geq \frac{S_{MAX}}{\sqrt{3}}$$

before failure, it shall be limited to $$p_r = \frac{S_{MAX}}{\sqrt{3}}$$

after failure, while the passive power command $q_r$ is zero, to avoid powers of the bridge arms of the phase without failure from exceeding a limit, i.e., the SST can be operated only under PF=1, to satisfy the demand for active powers as could as possible.

$$\left| \begin{array}{l} p_{r_{post}} = p_{r_{pre}} \\ |q_{r_{post}}| \leq \frac{1}{\sqrt{3}} \sqrt{1 - \frac{4}{3}\beta^2} S_{MAX} \end{array} \right. \text{ when } \beta < \frac{\sqrt{3}}{2}$$

The formula shows that when the active power of the system is $$p_r < \frac{S_{MAX}}{\sqrt{3}}$$

before failure, there is no influence on the active power after failure, while the passive power command $q_r$ is selected from the above range. That is, a four-quadrant operation may be realized while avoiding powers of the bridge arms of the phase without failure from exceeding the limit.

Correspondingly, the invention provides a method for powering a three-phase power supply system, wherein the three-phase power supply system comprises three phase branches forming a delta connection; each of the phase branches comprising at least one power conversion cell, the power conversion cell being at least two stages structure; the at least one power conversion cell of each of the phase branches being connected in parallel to the at least one power conversion cell of each of the other two phase branches; the power supply method comprises: when one of the phase branches stops operating, keeping the operation of the other two phase branches, and regulating active powers and reactive powers of the other two phase branches to balance three phase current of the three-phase power supply system.

Preferably, each of the power conversion cells comprises at least a first stage converter and a second stage converter in cascaded connection, and the second stage converter has a first terminal and a second terminal at a DC side.

Preferably, the at least one power conversion cell of each of the three phase branches are connected in series at AC sides and form a delta connection connected to an AC grid, the first terminals at the DC sides of all power conversion cells of the three phase branches are connected in parallel to a first bus, and the second terminals at the DC sides of all power conversion cells of the three phase branches are connected in parallel to a second bus.

Preferably, the at least one power conversion cell of each of the three phase branches are connected in series at AC sides and form a delta connection connected to an AC grid, each of the three phase branches has m DC ports at the DC sides, where m is greater than or equal to 2, and the at least one DC port is connected to the three phase branches.

Preferably, the power supply method further comprises making, by a main controller, communication connection with all power conversion cells of the three phase branches, receiving signals from the three phase branches, and regulating the three phase branches according to the signals.

Preferably, the power supply method further comprises: making, by at least three phase controllers, communication connection with the at least one power conversion cell of each of the three phase branches, respectively, each of the phase controllers further including a communication interface through which the at least three phase controllers are in communication connection with each other; wherein the phase controllers of each of the phase branches receive signals sent from the corresponding phase controllers of the other two phase branches through the communication interface to regulate the phase branch.

Preferably, the first stage converters and the second stage converters in the respective power conversion cells of the respective phase branches are controlled, respectively, wherein, an average bus voltage output from the first stage converters of the respective power conversion cells in the corresponding phase branch is controlled, and each of the phase branches controls reactive powers of the phase branch by receiving active power signals of the other two phase branches, receiving a reactive power command of the system, and generating reactive power adjustment values of the respective phase branches; each of the phase branches further controls active powers at DC sides of the second stage converters of the respective power conversion cells in the corresponding phase branch by receiving active power adjustment values of the other two phase branches.

Preferably, controlling active powers at the DC sides of the second stage converters of the respective power conversion cells in the corresponding phase branch relates to controlling voltages, currents, or powers at the DC sides.

Preferably, the power supply method further comprises: when the other two phase branches that keep operating trigger overcurrent protection, giving priority to demand for active powers, to demand for reactive powers, or to demand for fixed power factors, by the phase branch that correspondingly stops operating, according to a preset priority to trigger current limiting operation.

Preferably, the three-phase power supply system is operated in four quadrants.

Using the invention, when one of the phase branches stops operating, the other two phase branches of the three-phase power supply system may keep operating, and three phase current of the three-phase power supply system is balanced.

Through the invention, the four-quadrant operation also can be supported in "open delta".

Exemplary embodiments of the invention have been shown and described above. It shall be understood that the invention is not limited to the disclosed embodiments. Instead, the invention intends to cover various modifications and equivalent settings included in the spirit and scope of the appended claims.

What is claimed is:

1. A three-phase power supply system, comprising three phase branches forming a delta connection;
    each of the phase branches comprising at least one power conversion cell, the power conversion cell being of at least two stages;
    the at least one power conversion cell of each of the phase branches being connected in parallel to the at least one power conversion cell of each of the other two phase branches;
    wherein when one of the phase branches stops operating, the other two phase branches keep operating, and three phase current of the three-phase power supply system can be balanced by regulating active powers and reactive powers of the other two phase branches.

2. The three-phase power supply system according to claim 1, wherein each of the power conversion cells comprises at least a first stage converter and a second stage converter cascaded, and the second stage converter has a first terminal and a second terminal at a DC side.

3. The three-phase power supply system according to claim 2, wherein the at least one power conversion cell of each of the three phase branches are connected in series at AC sides and form a delta connection connected to an AC grid, the first terminals at the DC sides of all power conversion cells of the three phase branches are connected in parallel to a first bus, and the second terminals at the DC sides of all power conversion cells of the three phase branches are connected in parallel to a second bus.

4. The three-phase power supply system according to claim 2, wherein the at least one power conversion cell of each of the three phase branches are connected in series at AC sides and form a delta connection connected to an AC grid, each of the three phase branches has m DC ports at the DC sides, where m is greater than or equal to 2, and the at least one DC port is connected to the three phase branches.

5. The three-phase power supply system according to claim 2, wherein the first stage converters and the second stage converters in the respective power conversion cells of the respective phase branches are controlled, respectively,
    wherein an average bus voltage output from the first stage converters of the respective power conversion cells in the corresponding phase branch is controlled, and each of the phase branches controls reactive powers of the phase branch by receiving active power signals of the other two phase branches, receiving a reactive power command of the system, and generating reactive power adjustment values of the respective phase branches; and
    wherein each of the phase branches further controls active powers at DC sides of the second stage converters of the respective power conversion cells in the corresponding phase branch by receiving active power adjustment values of the other two phase branches.

6. The three-phase power supply system according to claim 5, further controlling voltages, currents, or powers at the DC sides of the second stage converters of the respective power conversion cells in the corresponding phase branch.

7. The three-phase power supply system according to claim 1, further comprising:
a main controller in communication connection with the at least one power conversion cell of the three phase branches, receiving signals from the three phase branches and regulating the three phase branches according to the signals.

8. The three-phase power supply system according to claim 1, further comprising:
at least three phase controllers in communication connection with the at least one power conversion cell of each of the three phase branches, respectively, each of the phase controllers further including a communication interface through which the at least three phase controllers are in communication connection with each other;
wherein the respective phase controllers of each of the phase branches receive signals sent from the corresponding phase controllers of the other two phase branches through the communication interface to regulate the phase branch.

9. The three-phase power supply system according to claim 1, wherein when the other two phase branches that keep operating trigger overcurrent protection, the phase branch that stops operating gives priority to demand for active powers, or gives priority to demand for reactive powers, or gives priority to demand for fixed power factors according to a preset priority to trigger current limiting operation.

10. The three-phase power supply system according to claim 1, wherein the three-phase power supply system is operated in four quadrants.

11. A power supply method for a three-phase power supply system, wherein the three-phase power supply system comprises three phase branches forming a delta connection; each of the phase branches comprising at least one power conversion cell, the power conversion cell being of at least two stages; the at least one power conversion cell of each of the phase branches being connected in parallel to the at least one power conversion cell of each of the other two phase branches; the power supply method comprises:
when one of the phase branches stops operating, keeping operation of the other two phase branches, and regulating active powers and reactive powers of the other two phase branches to balance three phase current of the three-phase power supply system.

12. The power supply method according to claim 11, wherein each of the power conversion cells comprises at least a first stage converter and a second stage converter cascaded, and the second stage converter has a first terminal and a second terminal at a DC side.

13. The power supply method according to claim 12, wherein the at least one power conversion cell of each of the three phase branches are connected in series at AC sides and form a delta connection connected to an AC grid, the first terminals at the DC sides of all power conversion cells of the three phase branches are connected in parallel to a first bus, and the second terminals at the DC sides of all power conversion cells of the three phase branches are connected in parallel to a second bus.

14. The power supply method according to claim 12, wherein the at least one power conversion cell of each of the three phase branches are connected in series at AC sides and form a delta connection connected to an AC grid, each of the three phase branches has m DC ports at the DC sides, where m is greater than or equal to 2, and the at least one DC port is connected to the three phase branches.

15. The power supply method according to claim 12, wherein the first stage converters and the second stage converters in the respective power conversion cells of the respective phase branches are controlled, respectively, wherein,
an average bus voltage output from the first stage converters of the respective power conversion cells in the corresponding phase branch is controlled, and each of the phase branches controls reactive powers of the phase branch by receiving active power signals of the other two phase branches, receiving a reactive power command of the system, and generating reactive power adjustment values of the respective phase branches;
each of the phase branches further controls active powers at DC sides of the second stage converters of the respective power conversion cells in the corresponding phase branch by receiving active power adjustment signals of the other two phase branches.

16. The power supply method according to claim 15, further comprising controlling voltages, currents, or powers at the DC sides of the second stage converters of the respective power conversion cells in the corresponding phase branch.

17. The power supply method according to claim 11, further comprising:
making, by a main controller, communication connection with all power conversion cells of the three phase branches, receiving signals from the three phase branches, and regulating the three phase branches according to the signals.

18. The power supply method according to claim 11, further comprising:
making, by at least three phase controllers, communication connection with the at least one power conversion cell of each of the three phase branches, respectively, each of the phase controllers further including a communication interface through which the at least three phase controllers are in communication connection with each other;
wherein the phase controllers of each of the phase branches receive signals sent from the corresponding phase controllers of the other two phase branches through the communication interface to regulate the phase branch.

19. The power supply method according to claim 11, further comprising:
when the other two phase branches that keep operating trigger overcurrent protection, giving priority to demand for active powers, to demand for reactive powers, or to demand for fixed power factors, by the phase branch that correspondingly stops operating, according to a preset priority to trigger current limiting operation.

20. The power supply method according to claim 11, wherein the three-phase power supply system is operated in four quadrants.

* * * * *